United States Patent
Marini et al.

(10) Patent No.: US 9,616,785 B2
(45) Date of Patent: Apr. 11, 2017

(54) INFINITELY VERTICALLY ADJUSTABLE DROP DOWN ARMREST MECHANISM

(71) Applicant: PAC Seating Systems, Inc., Palm City, FL (US)

(72) Inventors: Hector Noel Marini, Palm City, FL (US); Michael Edward Boyle, Port St. Lucie, FL (US); Kenneth Raymond Davie, Port St. Lucie, FL (US); Sean August Kimpel, Stuart, FL (US); Charles Christopher Tufano, Palm City, FL (US)

(73) Assignee: PAC SEATING SYSTEMS, INC., Palm City, FL (US)

( * ) Notice: Subject to any disclaimer, the term of this patent is extended or adjusted under 35 U.S.C. 154(b) by 11 days.

(21) Appl. No.: 14/151,339

(22) Filed: Jan. 9, 2014

(65) Prior Publication Data
US 2015/0191111 A1    Jul. 9, 2015

(51) Int. Cl.
*B60N 2/46* (2006.01)

(52) U.S. Cl.
CPC ........... *B60N 2/4606* (2013.01); *B60N 2/464* (2013.01)

(58) Field of Classification Search
USPC ................. 297/411.36, 411.35, 411.3, 411.2
See application file for complete search history.

(56) References Cited

U.S. PATENT DOCUMENTS

| | | | |
|---|---|---|---|
| 2,955,648 A * | 10/1960 | Krajewski | A47C 7/543 297/115 |
| 3,679,257 A * | 7/1972 | Jacuzzi | A47C 4/20 297/411.33 |
| 3,779,600 A * | 12/1973 | Quakenbush | B60N 2/464 108/147.22 |
| 5,795,025 A | 8/1998 | Murphy | |
| 5,795,026 A * | 8/1998 | Dral et al. | 297/411.36 |
| 5,823,976 A * | 10/1998 | Cain et al. | 601/23 |
| 5,829,839 A | 11/1998 | Wilkerson et al. | |
| 6,106,070 A | 8/2000 | Ritt et al. | |
| 6,132,001 A * | 10/2000 | Su | 297/411.36 |
| 6,209,960 B1 | 4/2001 | Bradbury | |
| 6,286,793 B1 * | 9/2001 | Hirose | B60N 2/464 248/118 |
| 6,540,296 B1 * | 4/2003 | Shats et al. | 297/353 |
| 7,156,466 B1 * | 1/2007 | Chang | 297/411.36 |

(Continued)

*Primary Examiner* — David R Dunn
*Assistant Examiner* — Alexander Harrison
(74) *Attorney, Agent, or Firm* — Troutman Sanders LLP

(57) ABSTRACT

A vehicle seat having a bottom frame, a seat back connected to the frame, and an armrest capable of upward and downward movement. The armrest includes a seat bracket connecting the armrest to the frame and a vertically variable adjustment mechanism. The mechanism has a control disposed in the armrest, a lock actuated to an engaged or disengaged position by the control, a rack disposed in a generally vertical direction, and a one-way bearing acting as pinion and having two rotational states. The first rotational state is a locked state where the lock is engaged and prevents the one-way bearing from rotating, preventing the rack and armrest from a downward movement. The second rotational state is a free state where the lock is in the engaged position and a force is applied in the upward direction, the one-way bearing can rotate, allowing the rack and armrest an upward movement.

18 Claims, 13 Drawing Sheets

(56) References Cited

U.S. PATENT DOCUMENTS

| | | | |
|---|---|---|---|
| 7,325,868 B2 * | 2/2008 | West et al. ........................ 297/4 |
| 7,357,051 B2 * | 4/2008 | Raum ............................ 74/535 |
| 7,387,342 B1 * | 6/2008 | Clough et al. ........... 297/411.36 |
| 7,434,887 B1 * | 10/2008 | Hsien ....................... 297/411.36 |
| 7,458,546 B2 | 12/2008 | Jang |
| 7,644,991 B2 * | 1/2010 | Davis et al. ............. 297/411.38 |
| 8,128,172 B2 | 3/2012 | Tsai |
| 9,107,507 B2 * | 8/2015 | Wallis ...................... A47C 7/54 |
| 2004/0004385 A1 * | 1/2004 | Lee .......................... 297/411.36 |
| 2004/0090104 A1 | 5/2004 | Seibold |
| 2004/0104611 A1 | 6/2004 | Caruso et al. |
| 2004/0183355 A1 * | 9/2004 | Lee et al. ................. 297/411.36 |
| 2006/0258517 A1 | 11/2006 | Ashley |
| 2007/0024100 A1 * | 2/2007 | Chan ........................ 297/411.36 |
| 2007/0278364 A1 | 12/2007 | Jang |
| 2009/0096271 A1 * | 4/2009 | Tsai ......................... 297/411.36 |
| 2010/0244532 A1 * | 9/2010 | Fiore et al. ............. 297/411.36 |
| 2012/0104823 A1 * | 5/2012 | Lai ........................... 297/411.36 |
| 2013/0119738 A1 * | 5/2013 | Wallis ...................... 297/411.36 |
| 2014/0139000 A1 * | 5/2014 | Ogg ............................ 297/411.2 |
| 2014/0183922 A1 * | 7/2014 | Cvek ....................... 297/411.36 |

\* cited by examiner

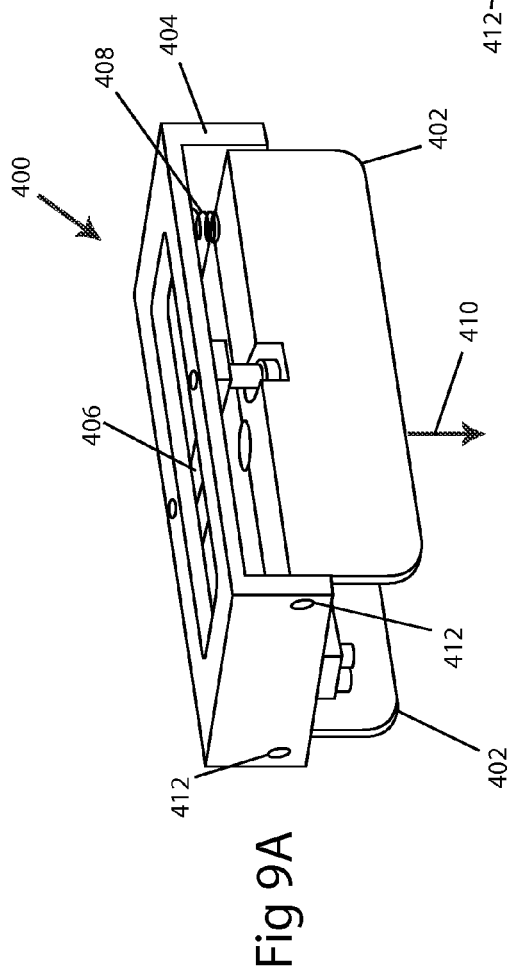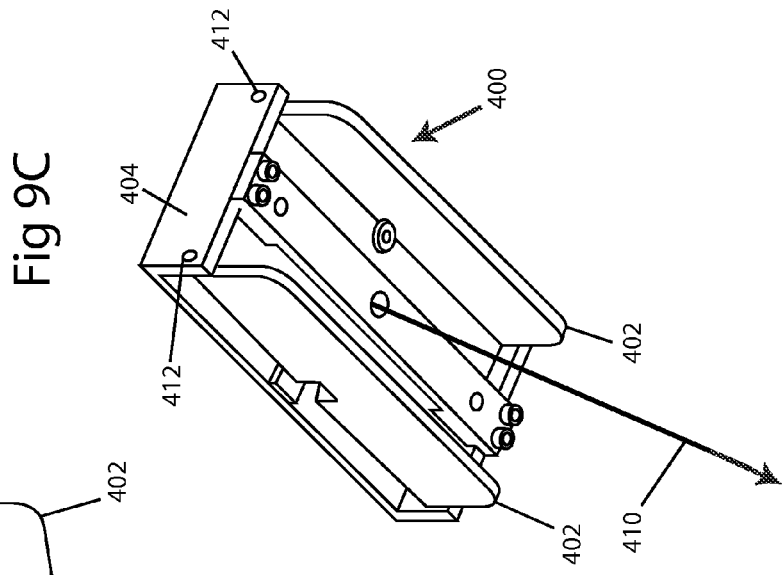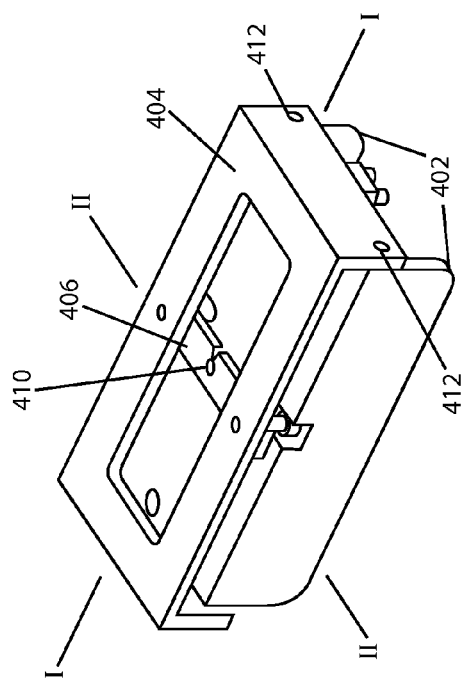

INFINITELY VERTICALLY ADJUSTABLE DROP DOWN ARMREST MECHANISM

FIELD OF THE INVENTION

The present invention relates to an improved, retractable, armrest for a vehicle seat which is comfortably and conveniently disposed for securely supporting a user's arm, but can be moved to an infinite number of vertical positions using a simple mechanism. More particularly, the invention concerns a vertically adjustable armrest for use in connection with furniture and with passenger vehicles such as aircraft, trains and busses.

BACKGROUND

Typical drop down armrests used in business jet aircraft seats have a mechanism that allows for generally vertical movement and positioning of the armrest. Most mechanisms consist of a touch latch type of locking device. Very commonly, the touch latch used is an M-lock style. U.S. Pat. No. 5,795,025 to Murphy illustrates the M-lock style touch latch.

A less common type of armrest uses a four bar linkage mechanism. This four bar linkage mechanism allows the arm to be adjusted vertically by swinging the armrest in a generally circular and downward motion.

When an M-lock style touch latch device is used for locking the armrest in the up position, the armrest usually only has two positions, fully up or fully down. The armrest typically requires a slight further upward movement to unlock and then the armrest is free to drop down. This design is functionally effective but has drawbacks.

The drawbacks include the noise of the lock mechanism as it engages and disengages, and noise as the armrest drops completely down. The armrest has no adjustability beyond the fully up and fully down position. Further, the slight upward movement of the armrest to disengage lock requires a gap in the finish upholstery or the use of very soft foam if a zero gap is desired. Neither option is fully acceptable, when a gap is chosen, it is unsightly, and when soft foam is chosen for zero gap, the leather and foam become prematurely worn at the compression point.

Thus, a need exists for a drop down armrest that reduces or eliminates the noises associated with adjusting the armrest, can be adjustable to any vertical position and requires zero gap in the upholstery.

A further consideration relates to the sturdiness of any such retractable armrest assembly, both in terms of general crashworthiness and in terms of being able to support the weight of a user's arms and/or upper body in the extended position. Thus, any such improved, retractable, aircraft seat armrest needs to comply with the rules and regulations of the Federal Aviation Administration relative to crashworthiness, and can be typically formed of a high-strength material. At the same time, any such improved retractable armrest assembly should be relatively lightweight and not bulky so as to maximize the fuel efficiency of the aircraft and the limited amount of seat space available within an aircraft. Such concerns may however, conflict with the general desirability of making the armrest substantially easy and uncomplicated to retract, which must also be addressed

SUMMARY

The present invention solves all of these drawbacks. By using a series of gears and bearings, we invented a mechanism that allows the armrest to be infinitely vertically adjustable, eliminates the locking noise, and requires zero gap in the upholstery.

Thus, an example of the present invention can include a vehicle seat having a seat bottom frame having a back and a side, a seat back connected to the back of the seat bottom frame, and an armrest connected to the side of the seat bottom frame, capable of vertical, upward and downward movement. The armrest can include a seat bracket connecting the armrest to the seat bottom frame and a vertically variable adjustment mechanism. The mechanism can have a control disposed in the armrest, a lock actuated to an engaged position and a disengaged position by the control, a rack disposed in a generally vertical direction, and a one-way bearing acting as pinion to the rack and having at least a first rotational state and a second rotational state.

The first rotational state of the one-way bearing can be a locked state where the lock is in the engaged position and prevents the one-way bearing from rotating. This prevents the rack from a downward movement, which prevents the armrest from the downward movement. The second rotational state of the one-way bearing can be a free state where the lock is in the engaged position and a force is applied in the upward direction, the one-way bearing can rotate, allowing the rack an upward movement, which allows the armrest the upward movement.

In another example, the one-way bearing has a third rotational state where when the lock is in the disengaged position allowing the one-way bearing to rotate, allowing the rack the downward movement, which allows the armrest the downward movement. Further, when the control is not actuated, the lock is in the engaged position and when the control is actuated, the lock is in the disengaged position.

Additionally, the armrest can include a cross-plate connected to the seat bracket and having a rail guide, and a rail inside the armrest, disposed in a vertical direction, and in sliding connection with the rail guide. The rail is disposed generally aligned with the rack, and the one-way bearing and the lock are disposed on the cross-plate.

In a yet further example, the control can be a butterfly mechanism and is upholstered under a fabric covering the armrest. The butterfly mechanism can have a frame, a paddle pivotally connected to the frame having a first arm and a second arm, and a sliding member disposed on the second arm and within the frame. A pivoting displacement of the first arm can pivot the paddle and displace the second arm, and the sliding member can be displaced in a vertical direction by the second arm.

Another example of the vehicle seat can be where the seat bracket further includes a rail guide in sliding connection with the rack, and the one-way bearing and the lock are disposed on the seat bracket. In addition, the seat can include a second seat bracket connecting the armrest to the seat bottom frame and having a second rail guide, and a rail inside the armrest, disposed generally aligned with the rack, and in sliding connection with the second rail guide. The rack can also have teeth only over a segment.

An example of a vertically variable armrest adjustment mechanism for an armrest of a vehicle seat can have a control disposed in the armrest, a lock actuated to an engaged and disengaged position by the control, a rack disposed in a generally vertical direction, and a one-way bearing acting as pinion to the rack and having at least a first rotational state and a second rotational state. A first rotational state of the one-way bearing is a locked state where the lock is in the engaged position and prevents the one-way bearing from rotating, preventing the rack from a downward movement, which prevents the armrest from a downward vertical movement. The second rotational state of the one-way bearing is a free state where the lock is in the engaged position and a force is applied in the upward direction, the one-way bearing can rotate, allowing the rack an upward movement, which allows the armrest an upward vertical movement.

The above mechanism can be one in which the one-way bearing has a third rotational state when the lock is in the disengaged position allowing the one-way bearing to rotate, allowing the rack the downward movement, which allows the armrest the downward vertical movement.

The control can be a butterfly mechanism having a frame, a paddle pivotally connected to the frame having a first arm and a second arm, and a sliding member disposed on the second arm and within the frame. A pivoting displacement of the first arm can pivot the paddle and displace the second arm, and the sliding member is displaced in a vertical direction by the second arm.

The mechanism can also include the rack having teeth only over a segment and the one-way bearing further having a friction stop synchronizing the one-way bearing to the teeth. In one example the friction stop has a ball detent and a dimple configured to be releasingly engaged.

Another aspect of the invention can be a control mechanism converting horizontal force into a vertical force. This includes a frame, a paddle pivotally connected to the frame having a first arm and a second arm, and a sliding member disposed on the second arm and within the frame. A pivoting displacement of the first arm can pivot the paddle and displace the second arm, and the sliding member is displaced in a vertical direction by the second arm. The paddle can be generally "L" shaped. Further, an elastic member can be disposed between the paddle and the frame, and returns the paddle to a rest position once the pivoting displacement is removed.

In addressing these shortfalls, as noted above, in an example, there is little to no noise generated by the actuation of the control and only a slight disengagement of the lock from the one-way bearing. The rails and rack can be designed to operate smoothly and almost silently. The one-way bearing can operate generally silently and can make almost no noise when the armrest is moved in the upward direction. Further, the butterfly mechanism is upholstered under the fabric of the armrest and no gap is required in the upholstery. There is sufficient give in even the tightest pulled fabric to allow the paddles of the butterfly mechanism to be actuated inwards.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

The drawing figures depict one or more implementations in accord with the present teachings, by way of example only, not by way of limitation. In the figures, like reference numerals refer to the same or similar elements.

FIG. 9A is a front, left perspective view of the butterfly mechanism;

FIG. 9B is a top, front, right perspective view of the butterfly mechanism;

FIG. 9C is a bottom, front right perspective view of the butterfly mechanism;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

An example of the invention will be described herein below with reference to FIGS. 1-7.

Figure 1:
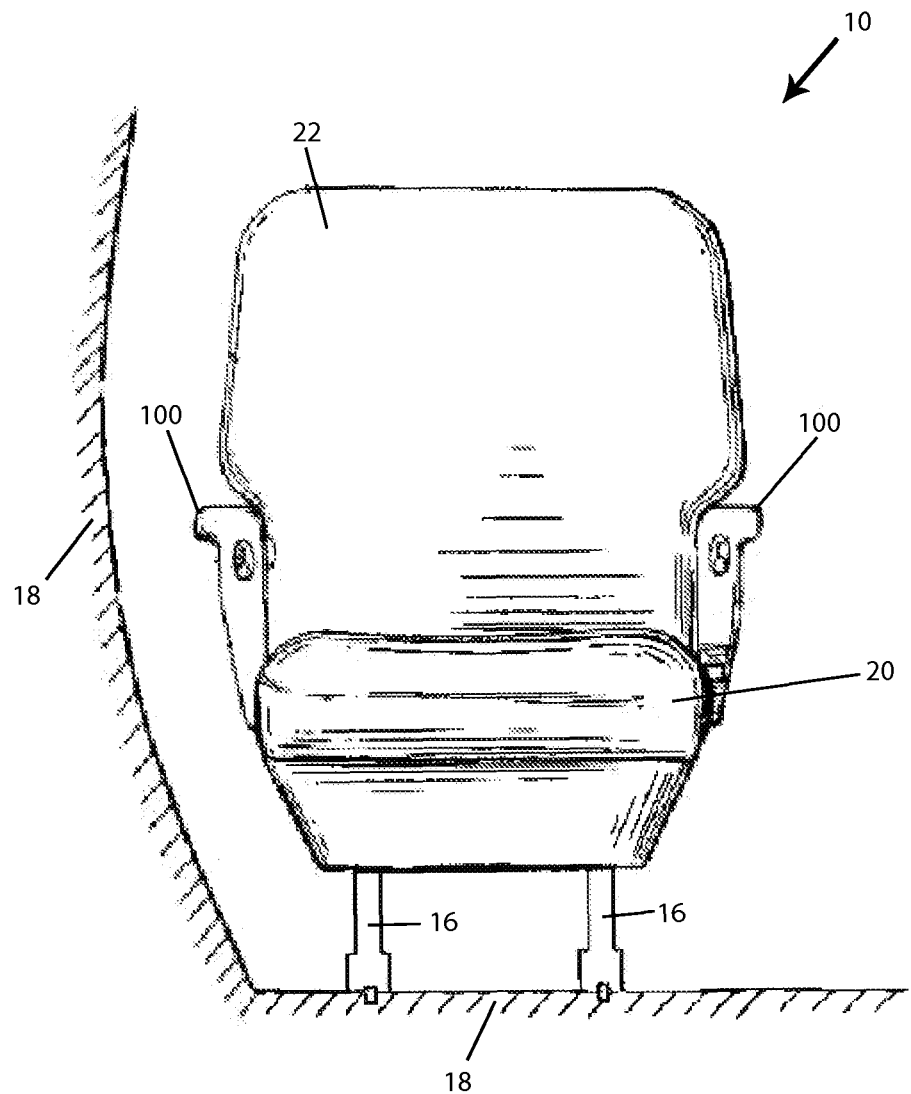
FIG. 1 is a front view of an upholstered aircraft seat of the present invention.
Figure 2:
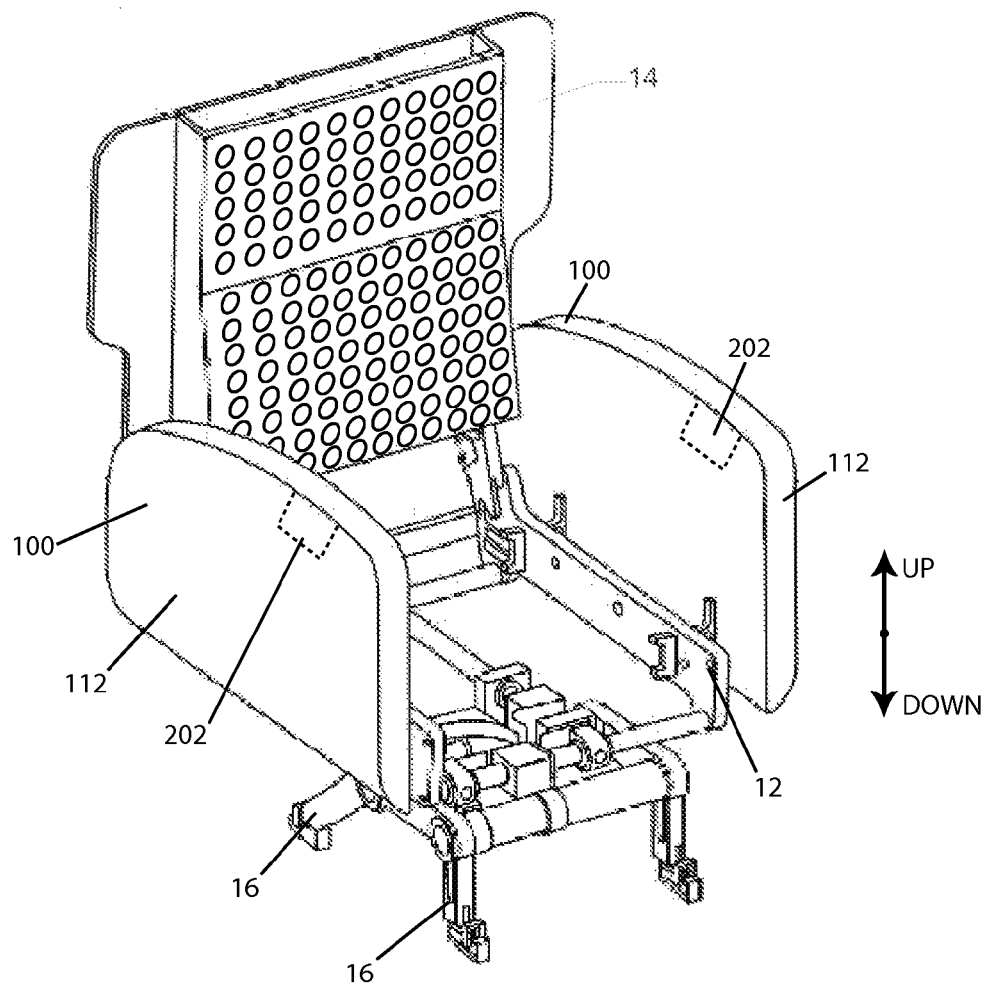
FIG. 2 is a partially cut-away perspective top, left side view of an aircraft seat of the present invention.
Figure 3:
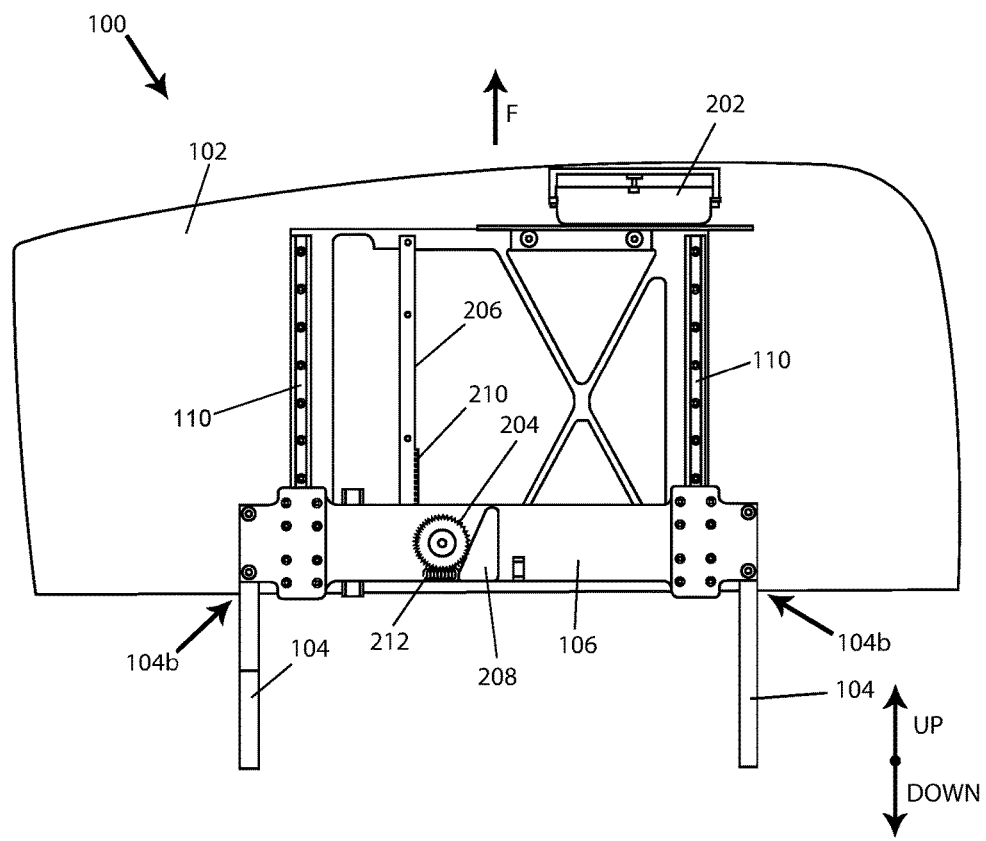
FIG. 3 is a partially cut-away of an outside of a right side armrest of the present invention.
Figure 4:
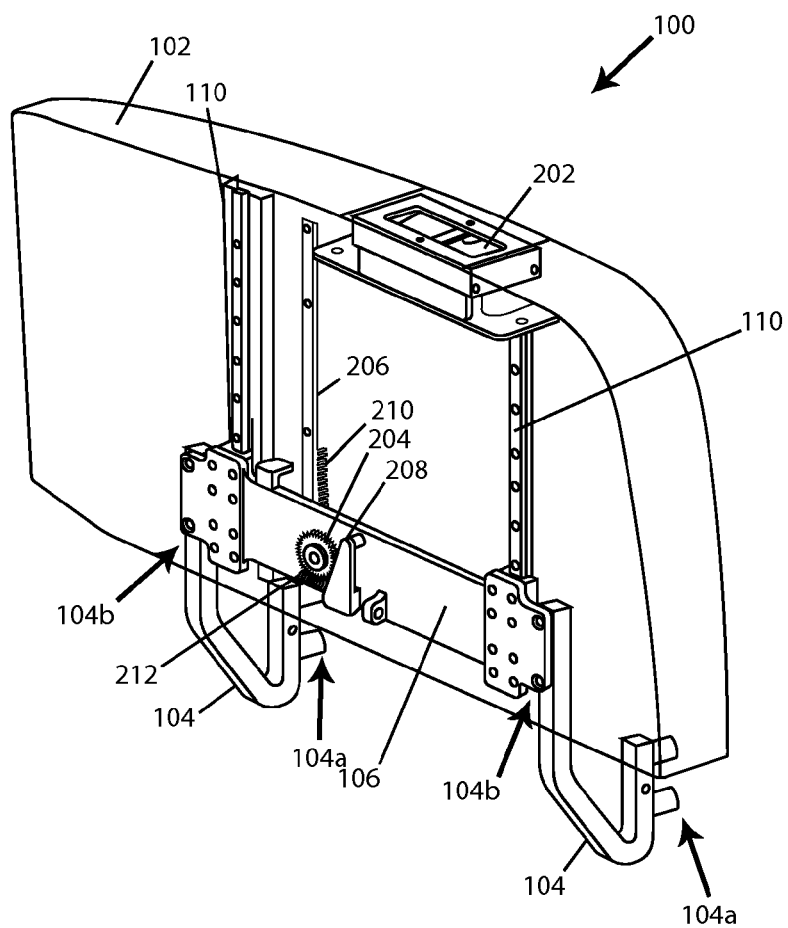
FIG. 4 is a partially cut-away perspective top, left side view of an outside of a right side armrest of the present invention.
Figure 5:
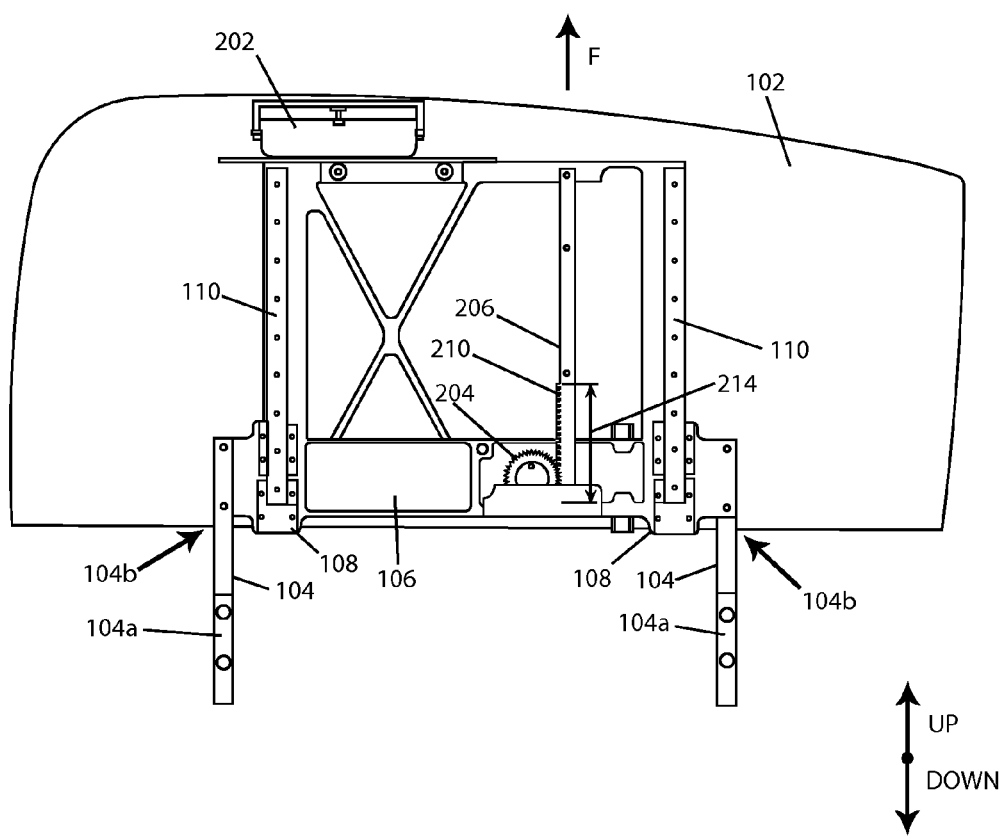
FIG. 5 is a partially cut-away of a seat-side of a right side armrest of the present invention.
Figure 6:
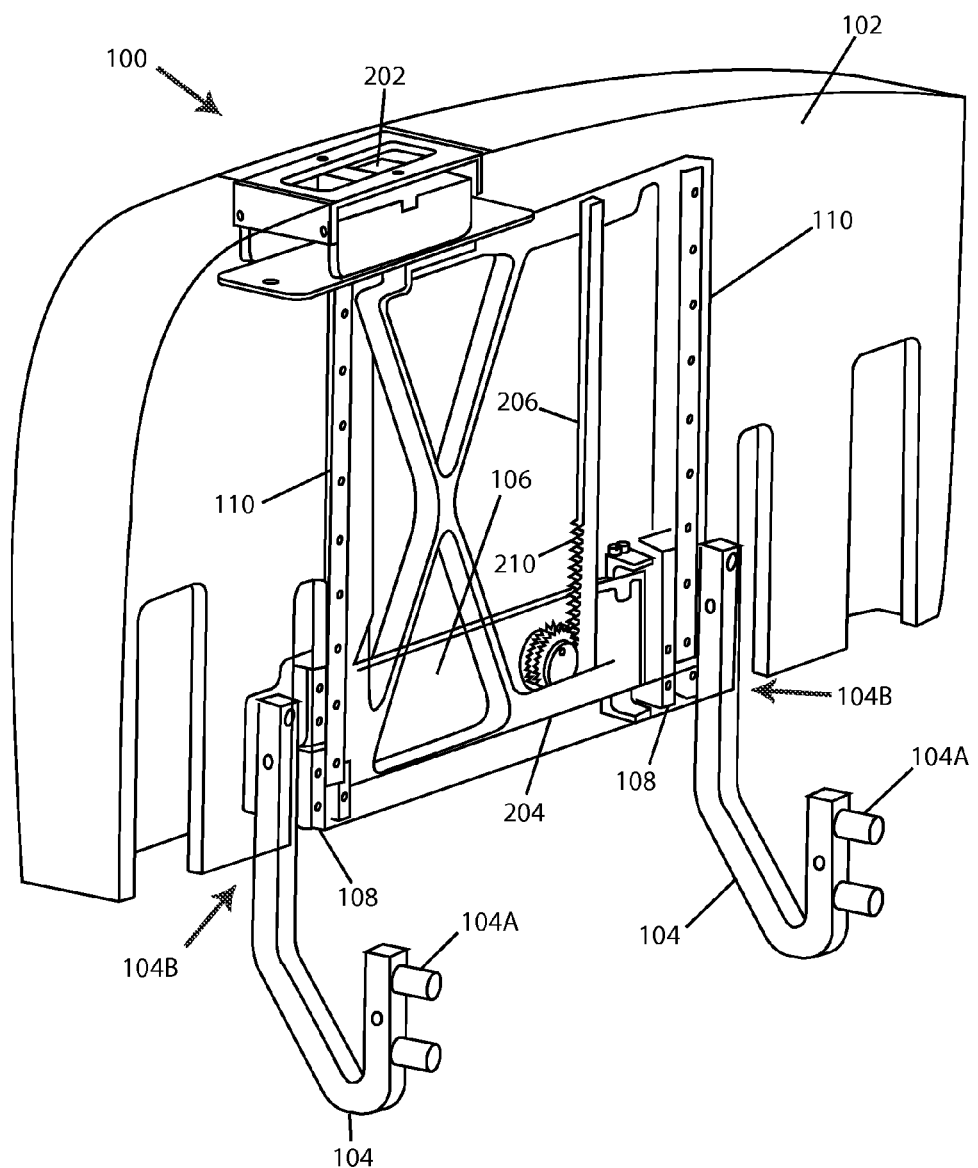
FIG. 6 is a partially cut-away perspective top, right side view of the seat-side of a right side armrest of the present invention.

FIGS. 1 and 2 illustrate a vehicle seat 10 that includes a seat bottom frame 12 and a seat back frame 14. The seat bottom frame 12 is attached, on a bottom side, to seat supports 16 which are fixed to the floor of a vehicle body 18. The seat back frame 14 can be pivotally attached to one end of the seat bottom frame 12. The seat bottom frame 12 and the seat back frame 14 have generally square and rectangular configurations, respectively, and can be made from aluminum, light gauge steel, alloys, a strong light-weight plastic, or composites. The seat base 20 is located over the top side of seat bottom frame 12 and is upholstered and padded to be in contact with a passenger or user. The seat base 20 typically covers the seat bottom frame 12. The seat back frame 14 is also upholstered to form a seat back 22. The seat back 22 can pivot from an upright position, to a reclined position, and back again.

The vehicle seat 10 is also provided with a pair of armrests 100. Both armrests are typically fixed to the seat bottom frame 12. On the outer surface of either armrest 100 can be a user operated seat reclining and/or pivoting control (not illustrated). When the seat reclining and/or pivoting control is actuated the seat back 22 and/or the seat base 20 can be reclined or rotated, respectively.

Turning now to FIGS. 3-7, the details of an example of an armrest 100 are illustrated. The armrest 100 includes a frame 102 which can be the entirety of the armrest 100 absent the mechanism described below. The frame 102 can include structural members to provide the armrest 100 with its shape, upholstered form, strength, and other controls, including the seat reclining and/or pivoting control. The particular details of these structures and controls are known in the art.

Another portion of the armrest 100 can be one or more seat brackets 104. One end of the seat brackets 104A engage the seat bottom frame 12. This engagement can be permanently affixed or engaged as described in U.S. Pat. No. 8,376,462 (herein incorporated by reference). The other end of the seat brackets 104B are attached to the armrest 100 through engaging with a cross-plate 106.

The cross-plate 106 can include one or more rail guides 108 (see FIGS. 5 and 6) to guide one or more rails 110 disposed in the armrest 100 and the frame 102. The rails 110 can slide freely within the guides 108 and the guides 108 and rails 110 permit the armrest to move in a vertical direction with respect to the seat bottom frame 12. The seat brackets 104 and the cross-plate 106 remain stationary as the frame 102 and rails 110 translate vertically, both up and down. An infinitely variable adjustment mechanism 200 can be unlocked to allow the armrest 100 to go down and allow the armrest 100 to be freely raised at any time by just holding onto the armrest 100 anywhere and pulling up to the desired position.

The infinitely variable adjustment mechanism 200 can include a control 202, a one-way bearing 204, a rack 206, and a lock 208. Turning to the one-way bearing 204, it typically has two rotational directions. Rotation can be in a first, "locked" direction, or a second, "free" direction.

Figure 8:
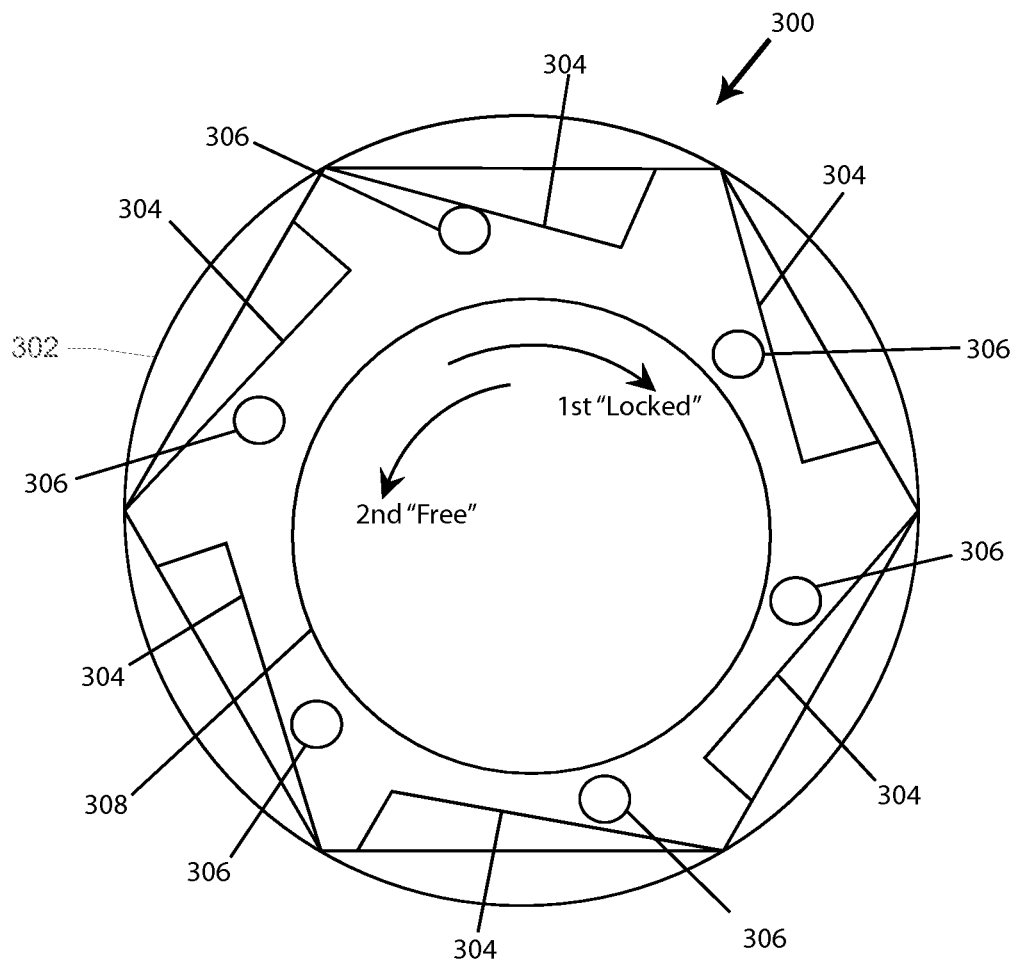
FIG. 8 is a cross-section view of an example of a one-way bearing.

FIG. 8 illustrates an example of a one-way bearing 300. Here, an outer wall 302 encloses inclines 304, rollers 306, and inner wall 308. As the bearing 300 is rotated in the "locked" direction, the rollers 306 move up the inclines 304, and as they reach the top of the incline 304 the rollers 306 are now friction locked between the inner and outer walls 308, 302. The bearing 300 is now "locked" and the outer and inner walls 302, 308 must rotate in the same direction. When rotating in the "free" direction, the rollers 306 move down the inclines 304 and the inner and outer walls 308, 302 are disengaged and the outer wall 302 can rotate in the second direction without impediment. Note that the inner wall 308 can be a shaft or engaged to a shaft or axis.

Note that there are a number of different examples of one-way bearings that can perform the above-described functions, and the above is only one example. Any suitable one-way bearing can be used in the present invention.

Turning back to the present example, the one-way bearing 204 can be typically mounted on the cross-plate 106 and can act as a pinion for the rack 206. The rack 206 can extend vertically and typically similar in length and orientation to the rails 110. The rack 206 can be attached to the armrest 100 and frame 102 and can be used to determine the armrest's vertical position. Another portion of the one-way bearing 204 can be engaged by the lock 208. The lock 208 can be actuated between an engaged and disengaged position by actuating the control 202. The lock 208, in one example, can be spring loaded with an elastic member 212 biasing the lock 208 to contact the one-way bearing 204. When the user actuates the control 202, the lock 208 is forced out of contact with the one-way bearing 204 and when the control 202 is released, the elastic member 212 returns the lock 208 back to the engaged position.

In one example of the infinitely variable adjustment mechanism 200 operation, the default condition is that when the control 202 is at rest, the lock 208 can engage the one-way bearing 204 and the one-way bearing 204 engages the rack 206. In this position, the armrest 100 is fixed in its vertical position and cannot move downwards. The downward force of the armrest 100 (which can include the weight supplied by the user's use of the armrest) rotates the one-way bearing 204 in the "locked" direction and the lock 208 prevents rotation of the one-way bearing 204. Prevention of the rotation of the one-way bearing 204 prevents the rack 206 from moving, securing the armrest 100 from downward motion.

In the next condition, the user actuates the control 202. In the present example, the control 202 can be a "butterfly mechanism" which can be upholstered under a fabric 112 (see FIG. 2) of the armrest 100. Upholstering the butterfly mechanism under the fabric 112 can result in no visibly discernible control outside the fabric 112 or through the fabric 112. The user can feel for the mechanism 202 to actuate them. The user can squeeze the paddles of the mechanism 202 to disengage the lock 208 from the one-way bearing 204. This allows the one-way bearing 204 to rotate in the first or "locked" direction, further allowing the rack 206 to move. As the rack 206 is permitted to move downwards, so the armrest 100 moves downwards. Disengaging the mechanism 202 places the lock 208 back into contact with the one-way bearing 204, stopping its rotation, and preventing the rack 206, and thus the armrest 100, from any further downward movement.

The third condition is the raising of the armrest 100. Here, the mechanism 202 does not need to be actuated and the lock 208 can remain engaged with the one-way bearing 204. The user can apply a force F upwards on the armrest 100. This can be done by simply pulling upwards anywhere on the armrest 100. The upward force can cause the opposite rotation of the one-way bearing 204 and allows the bearing 204 to rotate freely even though the lock 208 is engaged. The free rotation allows the rack 206 to move freely as well, permitting the armrest 100 to move upwards in response to the efforts of the user. When the user has raised the armrest 100 to its desired position, the user stops the upwards motion, which can be by releasing the armrest 100, and the weight of the armrest 100 reverses the rotation of the one-way bearing 204. This reverse rotation now rotates the one-way bearing 204 in the locked direction and the armrest 100 can remain in place. Given this example, the user can adjust the height of the armrest 100 to any vertical position along the rack 206.

Figure 7:
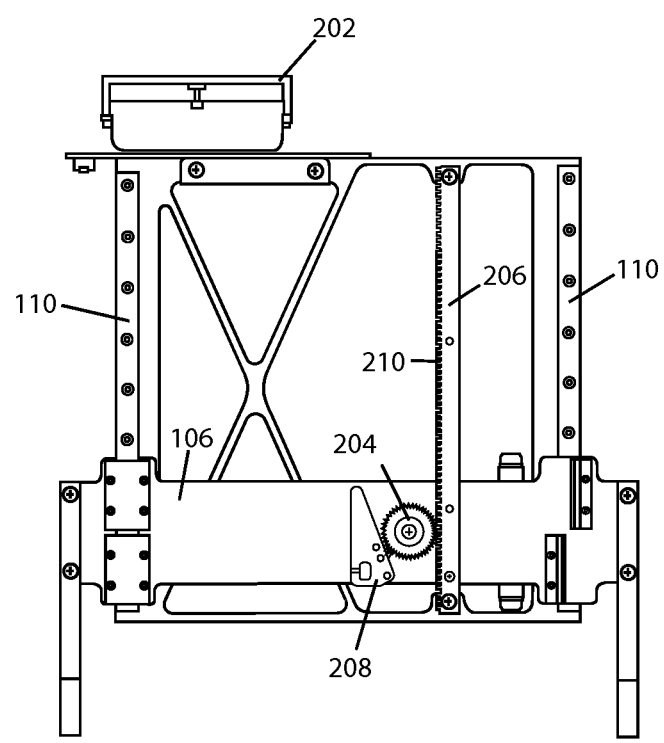
FIG. 7 is a side view of the outside of the infinitely variable adjustment mechanism for a left side armrest.

In one example, the rack 206 can have teeth 210 along its entire length, as illustrated in FIG. 7. In another example, the rack 206 can have teeth 210 only along a certain segment 214 (see FIG. 5). This segment 214 can be a small range where user's typically adjust the height of the armrest 100 for comfort. Typically, this range can be between 1 and 4 inches, 2 to 4 inches, 1 to 3 inches, and in one example, the segment 214 can be 3 inches. Once past the teeth 210 on the rack 206, the armrest 100 can move freely up or down.

Turning now to FIGS. 9A-9D, an example of the butterfly mechanism 400 that can be used as control 202 is illustrated and described in detail below. The mechanism 400 consists of one or more paddles 402 pivotally connected to a frame 404. The paddles 402 can be generally "L" shaped. On a top side of the paddles 402 rests a sliding member 406. When the paddles 402 are displaced inwards, the sliding member 406 can be displaced upwards. When the paddles 402 are released, one or more elastic members 408 displace the paddles 402 back to their rest position. When the paddles 402 are in their rest position, the sliding member 406 is returned to its rest position as well. A control wire 410 can be connected to the sliding member 406 and a tension can be applied to the wire 410 when the sliding member 406 is displaced upwards. The tension can act against the lock 208 to displace it and disengage it from the one-way bearing 204.

Figure 9D:
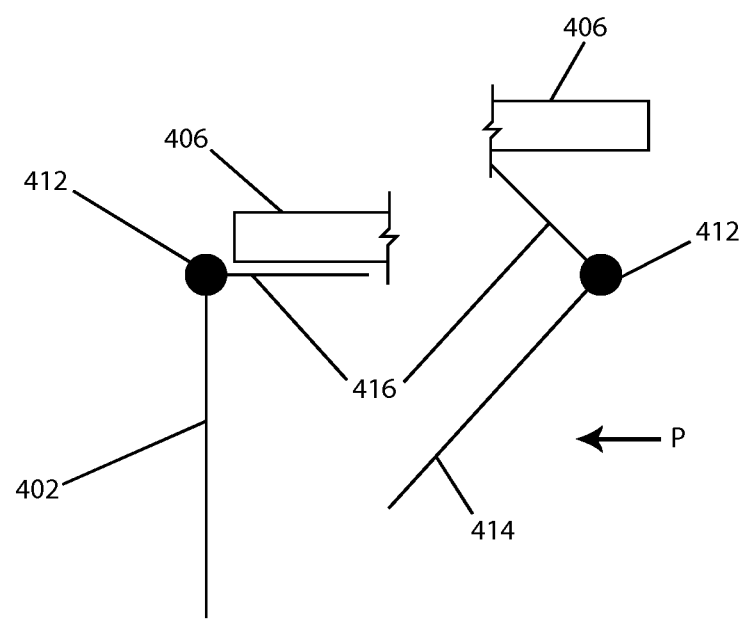
FIG. 9D is a partial cross-section across lines I-I and II-II illustrating the displacement of the sliding member.

FIG. 9D illustrates one example of how the butterfly mechanism 400 operates. The left side of the Figure shows the paddle 402 and sliding member 406 at rest. The right side of the figure illustrates the butterfly mechanism 400 as it is actuated. As a pressure P is applied (by a user) to a first arm 414 of the paddle 402, the paddle 402 pivots about a hinge point 412. This displaces a second arm 416 of the paddle 402, which, in turn, displaces the sliding member 406 upwards, in a vertical direction. Further, in this example, the displacement of the second arm 416 compresses the elastic member 408, so when the pressure P is released, the elastic member returns to its uncompressed state, and returns the paddle 402 to its rest position. The butterfly mechanism 400 thus allows a horizontal pressure to be converted to a vertical tension on the control wire 410. Another description is that the rotation of the paddles 402 can be transferred into a linear vertical motion by forcing the sliding member 406 upward. In one example, the paddle 420 is generally "L" shaped, thus the first and second arms 414, 416 may or may not meet at a right angle, and may be considered vertical and horizontal arms.

Figure 10:
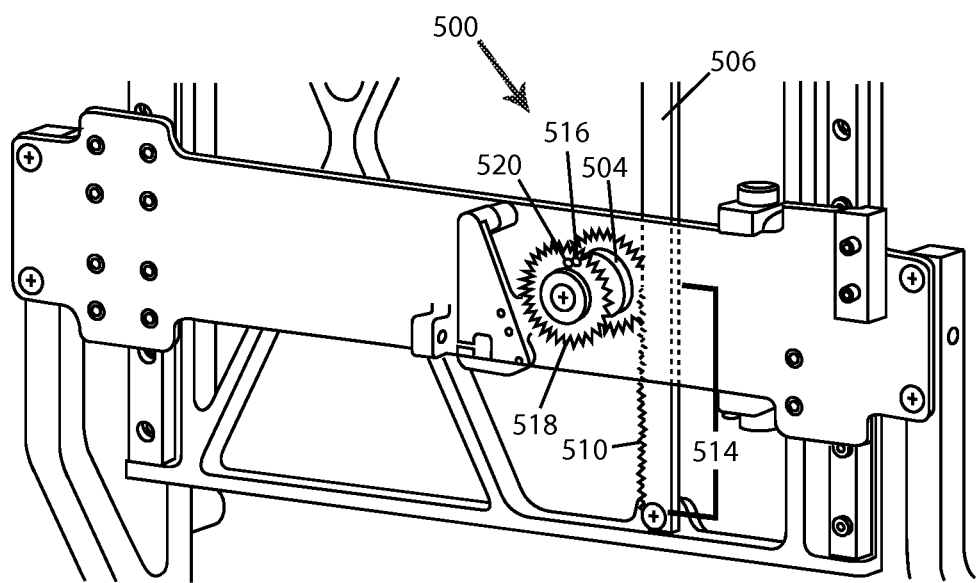
FIG. 10 is a partial side view of the outside of another example of the infinitely variable adjustment mechanism.

FIG. 10 illustrates a further example of an infinitely variable adjustment mechanism 500. Here, the rack 506 can have teeth 510 only along a certain segment 514, as similarly described above. In addition, a friction stop 516 is included on the one-way bearing 504. The friction stop 516 allows for timing between the rack 506 and locking gear 518 of the one-way bearing 504. Without the friction lock 516 the locking gear 518 can spin in the free direction of the one-way bearing 504 out of timing with rack 506 and cause jamming with the teeth 510 when reengaging the rack 506. In one example, a ball detent 516 can engage a dimple 520 machined into the locking gear 518. Thus, the friction lock 516 can synchronize the one-way bearing 504 with the teeth 510 of the rack 506. The detent 516 and dimple 520 and engage and disengage as the teeth 510 are engaged and disengaged from the one-way bearing 504 so the locking gear 518 can rotate accordingly.

Figure 11:
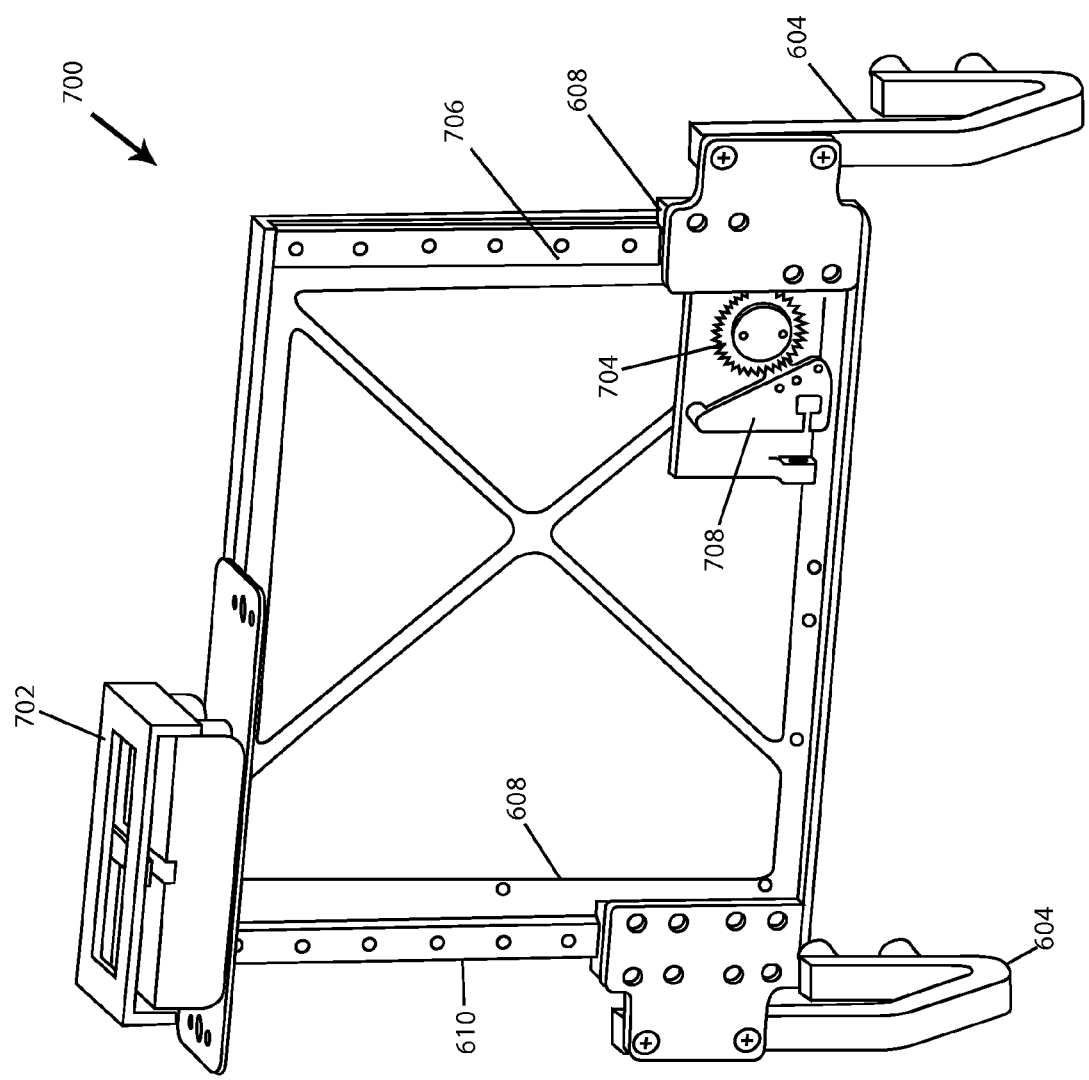
FIG. 11 is a side view of the outside of a further example of the infinitely variable adjustment mechanism.
Figure 12:
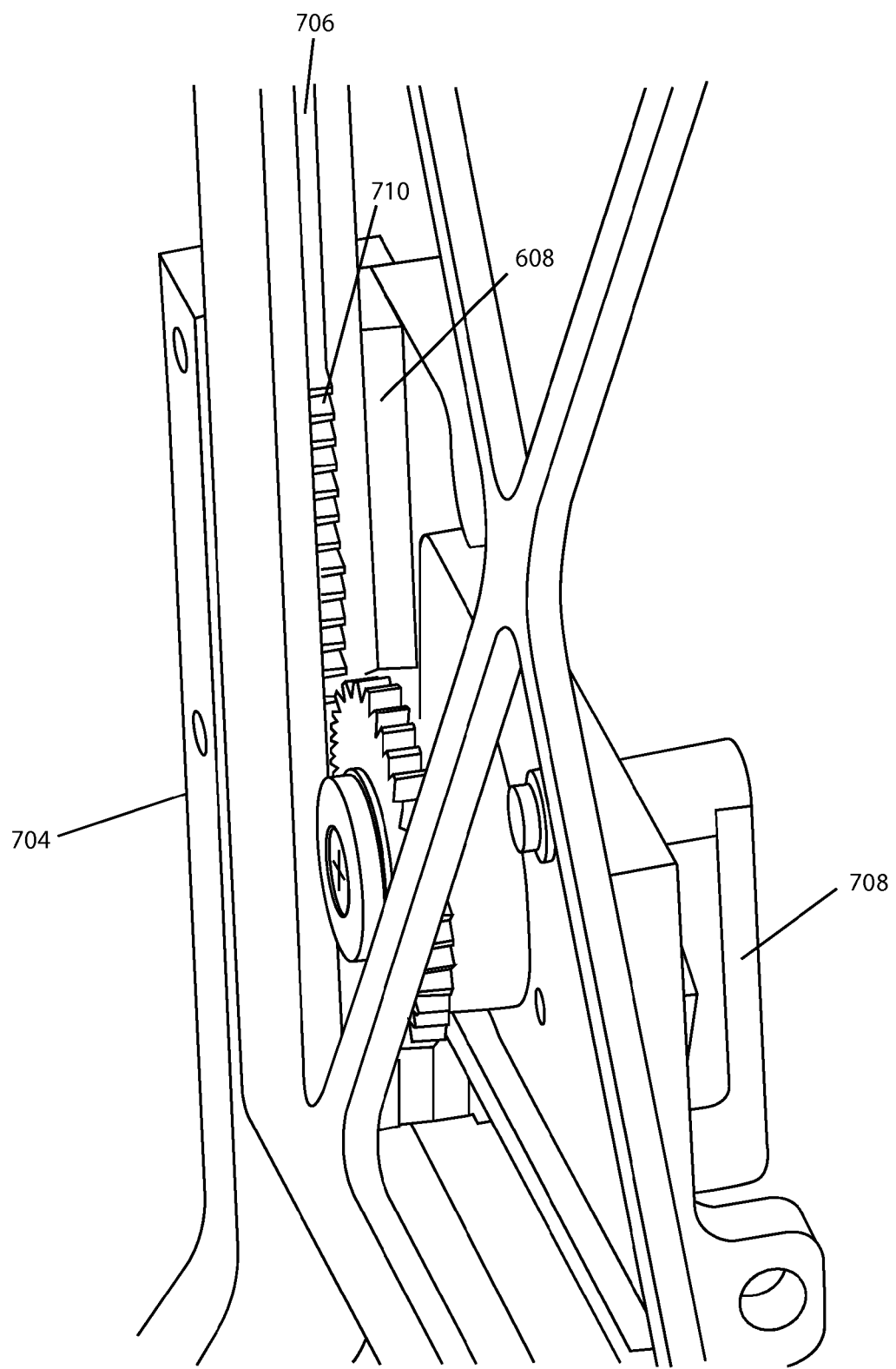
FIG. 12 is a partial, opposite side view of the further example of FIG. 11.

FIGS. 11 and 12 illustrate yet another example an infinitely variable adjustment mechanism 700. Here, the crossplate is removed and the mechanism can be streamlined. As illustrated, a seat bracket 604 can include a rail guide 608 to guide a rack 706 having teeth 710. A one-way bearing 704 can be mounted on the seat bracket 604 and can act as a pinion for the rack 706. The rack 706 can extend vertically and permit the armrest to move in a vertical direction with respect to the seat bottom frame. The rack 706 can be attached to the armrest and frame and can be used to determine the armrest's vertical position. Another portion of the one-way bearing 704 can be engaged by a lock 708. The lock 708 can be actuated between an engaged and disengaged position by actuating the control 702.

In a further example, the armrest can have another seat bracket 604 which can also have a rail guide 608 to guide a separate rail 610. The rail 610 can extend vertically and typically similar in length and orientation to the rack 706.

As is understood, the examples of the infinitely vertically adjustable armrest, as described above, can be used in connection with furniture and with passenger vehicles such as aircraft, trains and busses. In an example, the infinitely vertically adjustable armrest can be used in aircraft seating for business jets. These seats can be attached to an aircraft's fuselage 18 and must comply with rigorous standards for safety as set forth by the Federal Aviation Administration (FAA). Further, while the examples above describe a single armrest, vehicle seats can have multiple armrests and the invention can be used in each armrest.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A vehicle seat comprising:
   a seat bottom frame having a back and a side;
   a seat back connected to the back of the seat bottom frame; and
   an armrest connected to the side of the seat bottom frame, capable of vertical, upward and downward movement, the armrest comprising:
      a seat bracket connecting the armrest to the seat bottom frame; and
      a vertically variable adjustment mechanism, comprising:
         a control disposed in the armrest;
         a lock actuated to an engaged position and a disengaged position by the control;
         a rack disposed in a generally vertical direction; and
         a one-way bearing acting as pinion to the rack and having at least a first rotational state and a second rotational state,
      wherein the first rotational state of the one-way bearing is a locked state where the lock is in the engaged position and prevents the one-way bearing from rotating, this prevents the rack from a downward movement, which prevents the armrest from the downward movement,
      wherein the second rotational state of the one-way bearing is a free state where the lock is in the engaged position and a force is applied in the upward direction, the one-way bearing can rotate, allowing the rack an upward movement, which allows the armrest the upward movement, and
      wherein the control and the lock can be engaged and disengaged to allow and prevent the one-way bearing to rotate at any point in the generally vertical direction.

2. The vehicle seat of claim 1, wherein the one-way bearing has a third rotational state where when the lock is in the disengaged position allowing the one-way bearing to rotate, allowing the rack the downward movement, which allows the armrest the downward movement.

3. The vehicle seat of claim 1, wherein when the control is not actuated, the lock is in the engaged position and when the control is actuated, the lock is in the disengaged position.

4. The vehicle seat of claim 1, wherein the armrest further comprises:
   a cross-plate connected to the seat bracket and having a rail guide; and
   a rail inside the armrest, disposed in a vertical direction, and in sliding connection with the rail guide,
   wherein the rail is disposed generally aligned with the rack, and
   wherein the one-way bearing and the lock are disposed on the cross-plate.

5. The vehicle seat of claim 1, wherein the control is a butterfly mechanism and is upholstered under a fabric covering the armrest.

6. The vehicle seat of claim 5, wherein the butterfly mechanism comprises:
a frame;
a paddle pivotally connected to the frame comprising a first arm and a second arm; and
a sliding member disposed on the second arm and within the frame;
wherein a pivoting displacement of the first arm pivots the paddle and displaces the second arm, and
wherein the sliding member is displaced in a vertical direction by the second arm.

7. The vehicle seat of claim 1, wherein the seat bracket further comprises a rail guide in sliding connection with the rack,
wherein the one-way bearing and the lock are disposed on the seat bracket.

8. The vehicle seat of claim 7, further comprising:
a second seat bracket connecting the armrest to the seat bottom frame and having a second rail guide; and
a rail inside the armrest, disposed generally aligned with the rack, and in sliding connection with the second rail guide.

9. The vehicle seat of claim 1, wherein the rack comprises teeth only over a segment.

10. A vertically variable armrest adjustment mechanism for an armrest of a vehicle seat, comprising:
a control disposed in the armrest;
a lock actuated to an engaged and disengaged position by the control;
a rack disposed in a generally vertical direction; and
a one-way bearing acting as pinion to the rack and having at least a first rotational state and a second rotational state,
wherein the first rotational state of the one-way bearing is a locked state where the lock is in the engaged position and prevents the one-way bearing from rotating, preventing the rack from a downward movement, which prevents the armrest from a downward vertical movement,
wherein the second rotational state of the one-way bearing is a free state where the lock is in the engaged position and a force is applied in the upward direction, the one-way bearing can rotate, allowing the rack an upward movement, which allows the armrest a upward vertical movement, and
wherein the control and the lock can be engaged and disengaged to allow and prevent the one-way bearing to rotate at any point in the generally vertical direction.

11. The mechanism of claim 10, wherein the one-way bearing has a third rotational state when the lock is in the disengaged position allowing the one-way bearing to rotate, allowing the rack the downward movement, which allows the armrest the downward vertical movement.

12. The mechanism of claim 10, wherein the control is a butterfly mechanism comprising:
a frame;
a paddle pivotally connected to the frame comprising a first arm and a second arm; and
a sliding member disposed on the second arm and within the frame;
wherein a pivoting displacement of the first arm pivots the paddle and displaces the second arm, and
wherein the sliding member is displaced in a vertical direction by the second arm.

13. The mechanism of claim 10, wherein the rack comprises teeth only over a segment.

14. The mechanism of claim 13, wherein the one-way bearing further comprises a friction stop synchronizing the one-way bearing to the teeth.

15. The mechanism of claim 14, wherein the friction stop comprises a ball detent and a dimple configured to be releasingly engaged.

16. A control mechanism converting horizontal force into a vertical force, comprising:
a frame disposed in an armrest of a seat;
a paddle pivotally connected to the frame comprising a first arm and a second arm; and
a sliding member disposed on the top of the second arm and within the frame;
wherein a pivoting displacement of the first arm pivots the paddle towards an inside of the armrest of the seat and displaces the second arm, and
wherein the sliding member is displaced in a vertical direction by the second arm.

17. The control mechanism of claim 16, wherein the first and second arms of the paddle form a general "L" shape.

18. The control mechanism of claim 16, further comprising an elastic member disposed between the paddle and the frame,
wherein the elastic member returns the paddle to a rest position once the pivoting displacement is removed.

* * * * *